(12) United States Patent
Schmidt et al.

(10) Patent No.: US 11,621,553 B2
(45) Date of Patent: Apr. 4, 2023

(54) ELECTRICAL UNIT

(71) Applicant: ZF Friedrichshafen AG, Friedrichshafen (DE)

(72) Inventors: Ulrich Schmidt, Friedrichshafen (DE); Kai Leingruber, Ravensburg (DE); Georg Willmann, Markdorf (DE); Christian Aigner, Regensburg (DE); Paul Bange, Regenstauf (DE); Philipp Schmachtenberger, Regensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/313,370

(22) Filed: May 6, 2021

(65) Prior Publication Data

US 2021/0351585 A1 Nov. 11, 2021

(30) Foreign Application Priority Data

May 7, 2020 (DE) ...................... 10 2020 205 734.6

(51) Int. Cl.
*H02H 7/22* (2006.01)
*B60R 16/02* (2006.01)
*H02H 9/02* (2006.01)

(52) U.S. Cl.
CPC ............. *H02H 7/226* (2013.01); *B60R 16/02* (2013.01); *H02H 7/22* (2013.01); *H02H 9/02* (2013.01)

(58) Field of Classification Search
CPC . H02H 7/22; H02H 9/02; H02H 7/226; B60R 16/02; B60R 16/033; H02J 7/00; H02J 7/0021; G01R 31/36; G01R 31/362
USPC ......................................... 361/23, 93.7–93.9
See application file for complete search history.

(56) References Cited

U.S. PATENT DOCUMENTS

| | | | |
|---|---|---|---|
| 2016/0164318 A1* | 6/2016 | Sekizaki | H02J 7/0048 320/134 |
| 2022/0045642 A1* | 2/2022 | Koseki | H02P 25/22 |

* cited by examiner

*Primary Examiner* — Danny Nguyen
(74) *Attorney, Agent, or Firm* — Finch & Maloney PLLC

(57) ABSTRACT

An electrical assembly (100) having a first ground connection (145), a second ground connection (155), and a supply connection (135). The electrical assembly is designed for connecting with an electrical voltage between the supply connection (135) and at least one of the ground connections (145, 155). The assembly (100) includes a first electrical consumer (110) which is connected to the supply connection (135) and the first ground connection (145). A component (120) connects the second ground connection (155) to the first consumer (110). The component (120) is designed to produce a predetermined voltage drop.

10 Claims, 1 Drawing Sheet

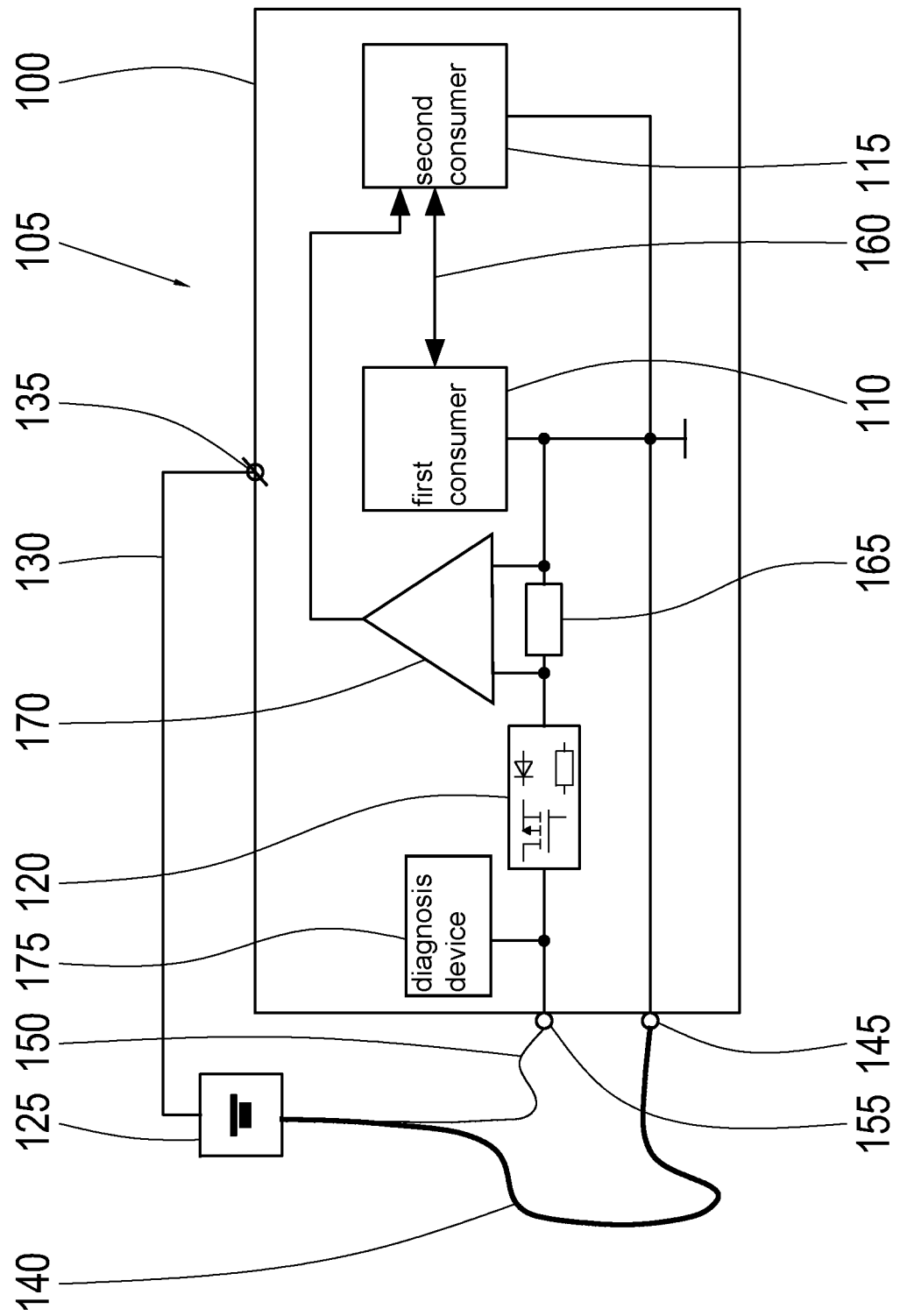

ELECTRICAL UNIT

This application claims priority from German patent application serial no. 10 2020 205 734.6 filed May 7, 2020.

FIELD OF THE INVENTION

The present invention relates to an electrical assembly, in particular for use on board a vehicle.

BACKGROUND OF THE INVENTION

A vehicle contains an electrical assembly, which can be designed to control a safety-relevant function. For example the assembly can control an element which is part of the drive-train of the vehicle. The drive-train can comprise a drive motor, a clutch, a transmission, a differential gear system and a drive wheel, and the assembly can be designed, for example, to control the clutch, the transmission or the differential gear system.

The assembly is usually operated at a predetermined electric voltage, which can be drawn from an on-board power supply of the vehicle. To ensure the functionality of the assembly even under adverse conditions, redundant connections of the assembly to the supply voltage can be provided. In particular, two mutually independent ground connections can be provided. If one of the ground connections becomes defective, a supply current for the assembly can flow through the second ground connection.

In the vehicle, the ground connections are usually electrically connected to one another at a central point. The connections are often designed differently, for example with regard to their length or the cross-section of a conductor, so that the voltage actually applied to the assembly may depend on the ground connection used. The ground potential of the assembly can differ from that of another assembly; in such a case one then speaks of a ground offset. The ground offset may be responsible for problems in the operation of the assembly, for example in the form of a distorted communication if the assembly is designed to communicate electrically with other assemblies.

SUMMARY OF THE INVENTION

A purpose of the present invention is to indicate an improved technique for the redundant supply of an electrical assembly. The invention achieves that objective by virtue of the objects of the independent claims. Subordinate claims describe preferred embodiments.

According to a first aspect of the present invention, an electrical assembly comprises a first ground connection; a second ground connection; and a supply connection. In this case the assembly is designed to form a connection with an electrical voltage between the supply connection and at least one of the ground connections. Furthermore the assembly comprises a first electrical consumer, which is connected to the supply connection and the first ground connection; and a component for connecting the second ground connection to the first consumer. The component is designed to produce a predetermined voltage drop.

During normal operation the two ground connections are usually connected outside the assembly to a common electrical potential by means of dedicated ground conductors. Due to the predetermined voltage drop the first ground connection is more "attractive" than the second, and a supply current flows mainly from the supply connection through the first consumer and farther on through the first ground connection. In such a case a current flow through the second ground connection can be vary small. Should the first ground connection no longer be connected to the common external potential, for example because a conductor has broken, then the current flows from the supply connection through the first consumer and farther on through the second ground connection. In this way the first consumer can be connected redundantly to the external ground potential. Another, second consumer can likewise be connected to the first ground connection, so that during normal operation no ground offset can occur between the consumers.

The component can be designed so that the voltage drop produced is essentially independent of a current flowing through the component. The voltage drop can for example be approximately 0.3, approximately 0.5 or approximately 0.7 V. In particular the component can comprise a semiconductor. The semiconductor can be designed to keep the predetermined voltage drop constant.

In a preferred embodiment, the component comprises a diode. The diode can also be comprised by another semiconductor, for example by a transistor, in particular a bipolar or a field-effect transistor. The diode is preferably operated in a 'pass' direction such that it lets through a current flowing in the direction of the second ground connection. In a further embodiment the transistor can be controlled by a further circuit to produce the voltage drop. The further circuit can in particular comprise an operational amplifier.

The component can in addition comprise a device for determining a current that flows through the second ground connection and a control device for controlling a current taken up by the assembly as a function of the current determined. In particular, the current flowing through the assembly can be reduced if the current determined exceeds a predetermined threshold value. The threshold value can be chosen as a function of a load capacity of a ground conductor connected to the second ground connection. The reduction of the current flowing can take place in such manner that a voltage applied at the first consumer does not exceed a predetermined value. This can ensure that the first consumer is always operated at a sufficiently high voltage that may be necessary for its function.

In a further embodiment a second consumer is provided, which is connected to the supply connection and to the first ground connection, wherein the control device is designed to reduce the current flowing through the second consumer as a function of the current determined. In this case the current flowing through the first consumer is not reduced by the control device.

The first and second consumers can be connected to one another, in particular by an electrical communication line. Between the consumers no ground offset can occur, with or without a failure of a ground conductor. This ensures improved communication between the two consumers.

The first consumer can be designed to control a safety-relevant function. The assembly can be provided on board a vehicle and the first consumer can be designed in particular to control a driving function of the vehicle. The vehicle can be a motor vehicle with a drive-train. The first consumer can be designed to control an element of the drive-train, such as a transmission or a clutch. By virtue of the technology describe here, for example, the drive-train can be more effectively prevented from operating uncontrolled or under erroneous control.

According to a further aspect of the present invention, a vehicle comprises an assembly as described herein. The vehicle can for example be a passenger car, a truck or a bus.

BRIEF DESCRIPTION OF THE DRAWINGS

The invention will now be described in greater detail with reference to the attached sole FIGURE, which shows in diagrammatic form;

FIG. 1. An electrical assembly on board a vehicle.

DETAILED DESCRIPTION OF THE PREFERRED EMBODIMENTS

The sole FIGURE shows an electrical assembly 100 on board a vehicle 105. The vehicle 105 is preferably a motor vehicle with a drive-train and the assembly 100 is preferably designed to control a component of the drive-train, for example a transmission. In the present embodiment, the assembly 100 comprises a first consumer 110, an optional second consumer 115 which can also be provided separately from the assembly 100, and a component 120 which will be described in greater detail below. In particular, the first consumer can be designed to control the components. The safety of the vehicle 105 can be threatened by erroneous control of the components.

The assembly 100 can be connected to an electrical voltage, which for example can be provided by an on-board power supply system of the vehicle 105 or by a battery 125. A high potential of the battery 125, for example a terminal 30 of the vehicle 105, can be connected to a supply connection 135 by means of a supply line 130. In a further embodiment (not shown here) two supply lines 130 are provided, which lead to two supply connections 135 of the assembly 100 and are connected to one another there.

A low potential of the battery 125, in particular a terminal 31 of the vehicle 105, which can be connected to an instrument ground of the vehicle 105, is connected by a first ground conductor 140 to a first ground connection 145 and by a second ground conductor 150 to a second ground connection 155 of the assembly 100.

The first consumer 110 preferably comprises a safety-relevant component such as an electric drive for a mechanical actuator, whereas the second consumer 115 in the present example comprises a non-safety-relevant component. The two consumers 110, 115 are connected to the first ground connection 145. Moreover, the two consumers 110, 115 are connected by way of the component 120 to the second ground connection 155. In the manner described, during normal operation the first consumer 110 is connected redundantly to the low potential and, also preferably, redundantly to the high potential of the battery 125 as well. The same applies to the second consumer 115.

As shown, the component 120 is provided between the first ground connection 145 and the second ground connection 150 and is designed, at its ends, to produce a predetermined voltage drop. The voltage drop is preferably less than about 1 V but as a function of an existing requirement it can also be chosen with a different value. Due to the component 120, the second ground connection 155 is at a potential different from that of the first ground connection 145 by the amount of the predetermined voltage drop, in the direction of the high potential.

The component 120 can for example comprise a diode, a Zener diode, an avalanche diode or a transistor. In a further embodiment the component 120 can also comprise a resistor, which is preferably chosen such that with a typical current uptake of the assembly 100, the predetermined voltage drop takes place at it.

During normal operation, in which both of the ground conductors 140, 150 are fully functional, a main part of a current flowing through the assembly 100 flows through the first ground connection 145, whereas only a lower current flows through the second ground connection 155. If the first ground conductor 140 is damaged, for example due to a reduction of its cross-section, heating, or breaking, so that its resistance is high enough to produce a voltage drop which is larger than the voltage drop at the component 120, a main part of the current flows through the second ground connection 155. In both cases the consumers 110, 115 are connected to the same ground potential so that there is no ground offset between them. Communication between them, for example via an optional communication line 160, can therefore take place without problems in each case in relation to transmitted electrical potentials.

The first ground conductor 140 is usually of dimensions sufficient to carry the current of both consumers 110, 115. However, in some circumstances the second ground conductor 150 is not designed to carry the total current of both consumers 110, 115, but is dimensioned so as mainly to supply the first consumer 110. To protect the second ground conductor 150 against overload, a device 165 for determining a current flowing through the second ground connection 155 and a control device 170 can be provided.

The device 165 can for example be in the form of a series resistance "shunt" between the second ground connection 155 and the consumers 110, 115. The control device 170 is further preferably designed to reduce a current uptake of the assembly 100 if the current determined exceeds a predetermined threshold value. For this, the control device 170 can for example comprise an operational amplifier or a comparator and can also be designed to partially or completely switch off the second consumer 115, which usually not safety-relevant, in order to protect the second ground conductor 150 against overload. In contrast, the possibly safety-relevant first consumer 110 should preferably not be throttled in its current uptake. The switching off of the second consumer 115 can be controlled by means of a corresponding signal, which can be emitted as an analog, digital, or coded message. The signal can be evaluated by the second consumer 115 directly or via a separate switching-off device.

In the representation shown in the sole FIGURE an optional diagnosis device 175 is also provided, which can be connected directly to the second ground connection 155. By means of the diagnosis device 175 a current flowing through the second ground connection 155 and/or a potential applied at the second ground connection 155 can be determined.

INDEXES

100 Assembly
105 Vehicle
110 First consumer
115 Second consumer
120 Component
125 Battery
130 Supply line
135 Supply connection
140 First ground conductor
145 First ground connection
150 Second ground conductor
155 Second ground connection
160 Communication line
165 Current-measuring device
170 Control device
175 Diagnosis device

The invention claimed is:

1. An electrical assembly comprising:
a first ground connection;
a second ground connection;
a supply connection;
the assembly being designed for connection with an electrical voltage between the supply connection and at least one of the first and the second ground connections;
a first electrical consumer being connected to the supply connection and the first ground connection;
a component for connecting the second ground connection to the first electrical consumer;
the component being designed to produce a predetermined voltage drop;
a device for determining a current flowing through the second ground connection; and
a control device for controlling a current taken up by the assembly as a function of the determined current.

2. The assembly according to claim 1, wherein the component is designed to produce the voltage drop independently of a current flowing through the component.

3. The assembly according to claim 1, wherein the component comprises a semiconductor.

4. The assembly according to claim 3, wherein the component comprises a diode.

5. The assembly according to claim 1, wherein the control device is designed to reduce the current taken up by the assembly when the determined current exceeds a predetermined threshold value.

6. The assembly according to claim 1, further comprising a second electrical consumer which is connected to the supply connection and the first ground connection; and
the control device is designed to reduce the current flowing through the second electrical consumer as a function of the determined current.

7. The assembly according to claim 6, wherein the first and the second electrical consumers are connected to one another by a communication line.

8. The assembly according to claim 1, wherein the first electrical consumer is designed to control a safety-relevant function.

9. A vehicle incorporating the assembly according to claim 1.

10. An electrical assembly comprising:
first and second ground connections;
a supply connection being connected to an electrical power supply;
the assembly being configured for connection with an electrical voltage between the supply connection and at least one of the first and the second ground connections;
a first electrical consumer being connected to the supply connection and the first ground connection;
a component connecting the second ground connection to the first electrical consumer, and the component being configured to produce a predetermined voltage drop;
a device for determining a current flowing through the second ground connection; and
a control device for controlling a current taken up by the assembly as a function of the determined current.

* * * * *